Patented Dec. 7, 1926.

1,609,806

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

COMPOSITION OF MATTER AND METHOD OF PRODUCING THE SAME.

No Drawing. Application filed October 19, 1922. Serial No. 595,682.

This invention relates to compositions of matter prepared from gums such as rubber, and its general object is to provide a new group of substances having superior characteristics adapting them for various uses such as impregnating, coating and insulating. A more specific object is to provide an improved and inexpensive reaction product of rubber and nitric acid, and a method of producing the same.

I am aware that heretofore rubber has been placed in dilute and also in concentrated water solutions of nitric acid, yielding a product containing nitrogen and oxygen and resembling the nitrosites formed by the action of nitrogen oxides on rubber, but the yield is small, only about 20 per cent of the rubber usually going into this product while the rest of the rubber is oxidized to oxalic acid, carbon dioxide, a syrupy, water-soluble, nitrogenous acid, etc.

In my method I obtain a high yield of a solid product, the weight thereof being 40% to 66% greater than the weight of the rubber used, according to the procedure employed. I accomplish this result by treating rubber in solution, the common rubber solvents such as carbon tetrachloride, benzene and gasoline being suitable, with concentrated nitric acid. The product separates out in yellow flocks or lumps, and is purified by filtering or decanting, and washing to remove any free acid. Upon being dried the product forms a bright yellow powder.

In a typical example, 500 grams of rubber is dissolved in 6.25 liters of carbon tetrachloride and 500 cc. of concentrated nitric acid is added thereto. The mixture is vigorously stirred for about an hour. It darkens and becomes somewhat thicker at first, but then changes, becoming thinner. After the stirring, the mixture is allowed to stand, and after several hours it becomes yellow in color and a gelatinous precipitate forms throughout the entire mixture. On longer standing this precipitate hardens to a yellow mass which can readily be broken up. During the course of the reaction, the temperature rises spontaneously to about 40° C. After the product has hardened, it is crushed, to liberate the occluded liquid, and filtered off. It is then purified by soaking in water to remove any free acid, and by drying. It forms a bright yellow powder. The yield of air-dried material is 833 grams, which is 66% more than the weight of the rubber used. This is practically a quantitative yield if we assume that a nitro-rubber is formed,—that is, one in which a hydrogen atom of each $C_5H_8$-nucleus is replaced by an $NO_2$-group, or a compound having the formula $(C_5H_7NO_2)x$. The 500 cc. of concentrated nitric acid used is but slightly more than the theoretical amount required for this reaction.

The product obtained by my method is slowly soluble in acetone, aniline, pyridine, nitrobenzene, and acetic anhydride, is somewhat soluble in ethyl acetate and glacial acetic acid, and is practically insoluble in benzene, gasoline, alcohol, ether, chloroform, carbon tetrachloride, carbon bisulfide, and water. It dissolves in aqueous sodium hydroxide and potassium hydroxide, and in concentrated ammonium hydroxide, with the production of a deep red color in each case, and from these solutions it can be precipitated with acids. It is insoluble in aqueous sodium carbonate. When heated it decomposes around 136° C. (277° F.), with evolution of a gas.

When benzene is used as the solvent in the example given above the final yield is in weight about 40% greater than the rubber used, and about 10% of brown material of lower melting point may be obtained by evaporating the solvent. When the benzene is used, a secondary reaction seems to set in after the formation of the gelatinous precipitate, bubbles of gas being formed, and the temperature may rise as high as 70° C. and it is apparently during this secondary reaction that the brown material of lower melting point, above mentioned, is formed. The chief product, when benzene is used, is not entirely soluble in acetone. If, however, an excess of nitric acid is used, the main product is more homogeneous and is almost completely soluble in acetone. Furthermore the yield of the main product is slightly increased and, correspondingly, the residue upon evaporation of the solvent is less.

Solutions of barium chloride, calcium chloride, etc., precipitate the corresponding salts or complexes when added to an alkaline solution of the main product obtained by my method. These precipitates are usually brownish-yellow in color and are gelatinous when wet.

The product can be converted into chemical derivatives which have properties varying according to the reagent used. For example, a methyl derivative can be prepared from its alkaline solution and di-methyl sulfate. Such methylated product is insoluble in alkali but otherwise has solubilities somewhat like those of the parent substance. It is much more stable toward heat, showing no signs of decomposition (except darkening) when heated in a melting-point tube even up to 303° C. (577° F.). Benzoyl chloride also reacts with the original product dissolved in aqueous sodium hydroxide and gives a product insoluble in alkalies. Acetic anhydride dissolves the original product with the formation of what appears to be an acetyl derivative.

Vulcanized rubber, allowed to swell or "dissolved" in a suitable solvent may be treated with nitric acid in accordance with the method herein described, and a good yield of a product substantially like that described may be obtained.

Numerous derivatives other than those above mentioned may be obtained by methods which will occur to those skilled in the art, and similar products may be obtained by substituting other gums, such as synthetic rubbers, balata, gutta percha, etc., for rubber in the method above described, wherefore I do not wholly limit my claims to the specific substances mentioned herein. The word gum, as used in the appended claims, is intended to embrace only rubber-like gums such as those mentioned above.

I claim:

1. The method of producing a composition of matter which comprises adding nitric acid to a solution of a rubber-like gum.

2. The method of producing a composition of matter which comprises adding nitric acid to a solution of rubber.

3. The method of producing a composition of matter which comprises adding nitric acid to a solution of rubber and treating the resulting nitric-acid-rubber product with an aqueous solution of an alkali to form a salt thereof.

4. The method of producing a composition of matter which comprises adding nitric acid to a solution of a rubber-like gum, removing the product from the solution, dissolving said product in an aqueous solution of an alkali, and treating the solution thus formed with a substance adapted to react therewith to form a derivative of the nitric-acid-gum product.

5. The method of producing a composition of matter which comprises adding nitric acid to a solution of a rubber-like gum, removing the product from the solution, dissolving said product in an aqueous solution of an alkali, and treating the solution thus formed with an alkylating reagent.

6. The method of producing a composition of matter which comprises reacting rubber in solution with nitric acid, treating the resulting nitric-acid-rubber product with an aqueous solution of an alkali, to form a salt thereof, and displacing the metal of the salt thus produced to form a substituted derivative of the nitric-acid-rubber product.

7. The method of producing a composition of matter which comprises adding nitric acid to a solution of rubber, treating the resulting nitric-acid-rubber product with an aqueous solution of an alkali to form a salt thereof, and displacing the metal of the salt thus produced with an organic residue.

8. The method of producing a composition of matter which comprises adding nitric acid to a solution of rubber, removing the product from the solution, dissolving said product in an aqueous solution of an alkali, and treating the solution thus formed with an alkylating reagent.

9. The method of producing a composition of matter which comprises adding nitric acid to a solution of a vulcanized rubber-like gum.

10. The method of producing a composition of matter which comprises adding nitric acid to a solution of vulcanized rubber.

11. The product obtained by treating an alkaline solution of the nitric acid derivative of a rubber-like gum with a substance adapted to react therewith to form a derivative of the nitric-acid-gum product.

12. The product obtained by treating an alkaline solution of the nitric acid derivative of a rubber-like gum with an alkylating reagent.

13. The product obtained by treating an alkaline solution of the nitric acid derivative of rubber with an alkylating reagent.

14. The direct reaction product of nitric acid and rubber in solution.

15. A reaction product of rubber and nitric acid, said reaction product being insoluble in sodium carbonate.

16. The direct reaction product of nitric acid and a solution of a vulcanized rubber-like gum.

17. The direct reaction product of nitric acid and a solution of vulcanized rubber.

In witness whereof I have hereunto set my hand this 14 day of October, 1922.

HARRY L. FISHER.